(12) United States Patent
Wolfertshofer et al.

(10) Patent No.: US 8,669,981 B1
(45) Date of Patent: Mar. 11, 2014

(54) IMAGES FROM SELF-OCCLUSION

(75) Inventors: Daniel Wolfertshofer, Burghausen (DE); Marc Alexa, Berlin (DE); Wojciech Matusik, Lexington, MA (US)

(73) Assignee: Disney Enterprises, Inc., Burbank, CA (US)

( * ) Notice: Subject to any disclaimer, the term of this patent is extended or adjusted under 35 U.S.C. 154(b) by 543 days.

(21) Appl. No.: 12/968,026

(22) Filed: Dec. 14, 2010

Related U.S. Application Data

(60) Provisional application No. 61/358,365, filed on Jun. 24, 2010.

(51) Int. Cl.
*G06T 15/00* (2011.01)

(52) U.S. Cl.
USPC ........... 345/428; 345/420; 345/422; 345/426; 345/419

(58) Field of Classification Search
USPC .......................... 345/419, 420, 422, 426, 428
See application file for complete search history.

(56) References Cited

U.S. PATENT DOCUMENTS

| | | | |
|---|---|---|---|
| 6,791,542 B2 * | 9/2004 | Matusik et al. | 345/420 |
| 6,903,738 B2 * | 6/2005 | Pfister et al. | 345/420 |
| 7,068,274 B2 * | 6/2006 | Welch et al. | 345/426 |
| 7,167,177 B2 * | 1/2007 | Guo et al. | 345/426 |
| 8,164,593 B2 * | 4/2012 | Sun et al. | 345/426 |

* cited by examiner

*Primary Examiner* — Phu K Nguyen
(74) *Attorney, Agent, or Firm* — Patterson & Sheridan, LLP

(57) ABSTRACT

A method for generating a self-occlusion surface for an image. The method includes receiving the image, receiving a selection of a material with which to construct the self-occlusion surface, and receiving calibration data associated with the material. A plurality of pits is determined, based on the image and calibration data, to define within the self-occlusion surface. A preview of the self-occlusion surface is rendered based on the plurality of pits and the material.

26 Claims, 6 Drawing Sheets

IMAGES FROM SELF-OCCLUSION

CROSS-REFERENCE TO RELATED APPLICATIONS

This application claims benefit of U.S. provisional patent application Ser. No. 61/358,365, filed on Jun. 24, 2010, which is hereby incorporated by reference herein.

BACKGROUND

1. Field of the Invention

Embodiments of the invention relate to fabrication of materials, in particular, to a system and method for simulating and/or fabricating self-occlusion surfaces that reproduce an image.

2. Description of the Related Art

For some time, artists have been experimenting with the visual effect of self-occlusion on surfaces. For example, sculpting chisel marks in surfaces causes shading due to occlusion of light that is either trapped or redirected by the sculpted chisel marks. Artists can use this shading to reproduce an image on surfaces composed of a uniform material. Unlike paintings, these surfaces withstand harsh environmental conditions such as light and moisture. Thus, shading from self-occlusion is a useful and proven tool for many artists.

Producing self-occlusion surfaces, however, is a time-consuming process for artists. For example, artists often make mistakes when sculpting, including applying too much pressure, using tools that are too sharp or too dull, and/or using tools that are too large or small. Also, popular surfaces in which chisel marks are placed—such as plaster or stone—are frail and brittle by nature, making it difficult to correct such mistakes when they occur. These shortcomings significantly lengthen the amount of time and work that is required for an artist to produce a self-occlusion surface.

As the foregoing illustrates, there is a need in the art for an improved technique for generation self-occlusion surfaces.

SUMMARY

Embodiments of the invention provide techniques for simulating and/or fabricating a SOS that reproduces an image. In some embodiments, a SOS material is selected and calibrated. An image is received and analyzed to determine a mapping between features of the image and pits in the calibrated SOS. Although hexagonal pit distribution allows a maximum number of pits to be established in the SOS, irregular pit distribution, in most cases, generates a SOS that more accurately reproduces the image.

One embodiment of the invention provides a method for generating a self-occlusion surface for an image. The method includes receiving the image, receiving a selection of a material with which to construct the self-occlusion surface, and receiving calibration data associated with the material. A plurality of pits is determined, based on the image and calibration data, to define within the self-occlusion surface. A preview of the self-occlusion surface is rendered based on the plurality of pits and the material.

Advantageously, embodiments of the invention provide for an interesting way to represent images in various materials, either simulated or fabricated.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide techniques for simulating and/or fabricating a SOS that reproduces an image. In some embodiments, a SOS material is selected and calibrated. An image is received and analyzed to determine a mapping between features of the image and pits in the calibrated SOS. Although hexagonal pit distribution allows a maximum number of pits to be established in the SOS, irregular pit distribution, in most cases, generates a SOS that more accurately reproduces the image.

Figure 1:
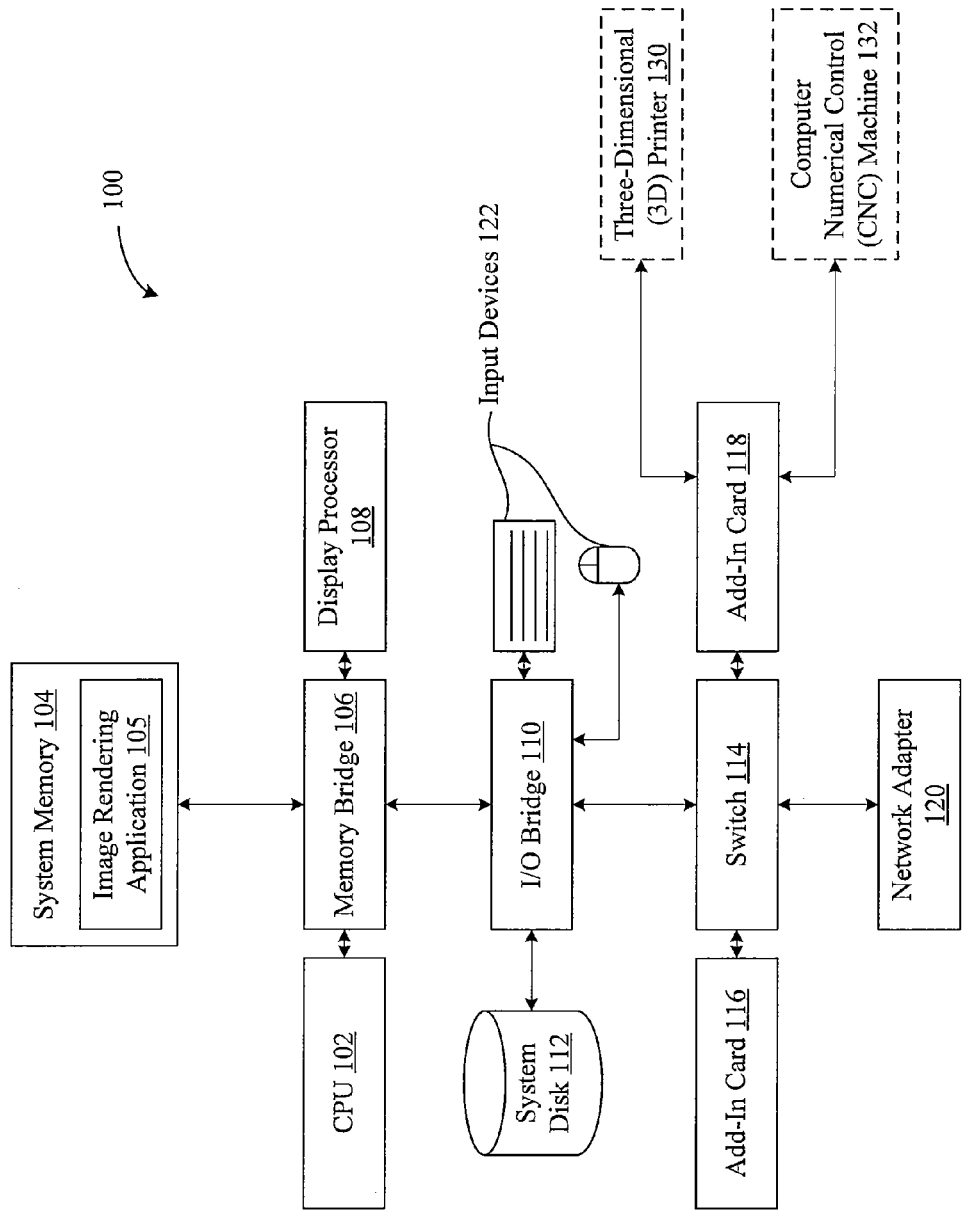
FIG. 1 is a block diagram of a system configured to implement one or more aspects of the invention.

FIG. 1 is a block diagram of a system 100 configured to implement one or more aspects of the invention. System 100 may be a computer workstation, personal computer, video game console, or any other device suitable for practicing one or more embodiments of the present invention.

As shown, system 100 includes a central processing unit (CPU) 102 and a system memory 104 communicating via a bus path that may include a memory bridge 106. CPU 102 includes one or more processing cores, and, in operation, CPU 102 is the master processor of system 100, controlling and coordinating operations of other system components. System memory 104 stores software applications and data for use by CPU 102, such as image rendering application 105 used to simulate self-occlusion surfaces (SOSs). CPU 102 runs software applications and optionally an operating system. Memory bridge 106 is connected via a bus or other communication path to an I/O (input/output) bridge 110. I/O bridge 110 receives user input from one or more user input devices 122 (e.g., keyboard, mouse, joystick, digitizer tablets, touch pads, touch screens, still or video cameras, motion sensors, and/or microphones) and forwards the input to CPU 102 via memory bridge 106.

A display processor 108 is coupled to memory bridge 106 via a bus or other communication path; in one embodiment display processor 108 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 108 periodically delivers pixels to a display device. In some embodiments, the display device is a projector, such as an LCD projector, DLP projector, or the like. Display processor 108 can provide display device with an analog or digital signal.

A system disk 112 is also connected to I/O bridge 110 and may be configured to store content and applications and data for use by CPU 102 and display processor 108. System disk 112 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 114 provides connections between I/O bridge 110 and other components such as a network adapter 120 and various add-in cards 116 and 118. As shown, the add-in card 118 may be optionally connected to three-dimensional printer 130 and/or computer numerical control (CNC) machine 132, where each is used to fabricate SOSs. Network adapter 120 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 110. For example, an audio processor may be used to generate analog or digital audio output from instructions and/or data provided by CPU 102, system memory 104, or system disk 112. Communication paths interconnecting the various components in FIG. 1 may be implemented using any suitable bus or point-to-point communication protocol(s), and connections between different devices may use different protocols, as is known in the art.

In one embodiment, display processor 108 incorporates circuitry optimized for graphics and video processing, including, for example, video output circuitry, and constitutes a graphics processing unit (GPU). In another embodiment, display processor 108 incorporates circuitry optimized for general purpose processing. In yet another embodiment, display processor 108 may be integrated with one or more other system elements, such as the memory bridge 106, CPU 102, and I/O bridge 110 to form a system on chip (SoC). In still further embodiments, display processor 108 is omitted and software executed by CPU 102 performs the functions of display processor 108.

Pixel data can be provided to display processor 108 directly from CPU 102. In some embodiments of the present invention, instructions and/or data representing a scene are provided to a render farm or a set of server computers, each similar to system 100, via network adapter 120 or system disk 112. The render farm generates one or more rendered images of the scene using the provided instructions and/or data. These rendered images may be stored on computer-readable media in a digital format and optionally returned to system 100 for display.

Alternatively, CPU 102 provides display processor 108 with data and/or instructions defining the desired output images, from which display processor 108 generates the pixel data of one or more output images. The data and/or instructions defining the desired output images can be stored in system memory 104 or graphics memory within display processor 108. Display processor 108 can further include one or more programmable execution units capable of executing shader programs—such as image rendering application 105, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 106 and CPU 102. In other alternative topologies display processor 108 is connected to I/O bridge 110 or directly to CPU 102, rather than to memory bridge 106. In still other embodiments, I/O bridge 110 and memory bridge 106 might be integrated into a single chip. The particular components shown herein are optional; for instance, any number of add-in cards or peripheral devices might be supported. In some embodiments, switch 114 is eliminated, and network adapter 120 and add-in cards 116, 118 connect directly to I/O bridge 110.

Method to Generate Self-Occlusion Surfaces from an Image

In some embodiments, a first step in creating and analyzing SOSs (self-occlusion surfaces) involves establishing a definition for an image generated by a pitted SOS. In one embodiment, a Voronoi cell is associated with each pit included in the SOS, and a gray value is modeled in each cell as a constant. Each pit may be represented by the equation $P=\{(p_p, p_v)\}$, where $p_p$ represents the position of the center of the pit p and $p_v$, is an associated value.

Next, a data-driven model is used to generate a table that converts the values $p_v$ to a depth for a corresponding pit, where the table depends on the material of the SOS. Second, optimal placement of the pits in the SOS is considered. More specifically, while the densest packing for circular pits in a plane is a hexagonal grid, an alternate method that incorporates a natural error is found to generate SOSs that exhibit fewer visual artifacts. Lastly, a simulation procedure may be used to preview a SOS produced by the foregoing steps, whereupon the SOS is optionally fabricated.

Data-Driven Pit Model

A SOS best-reproduces an image when radiance values produced by the SOS coincide with those produced by the image. Such radiance values are influenced by several factors, including a position of a viewer relative to the SOS, the angle at which light is reflected off of the SOS, and the number of light sources that illuminate the SOS. It is assumed, in the embodiments of the invention described herein, that the SOS is being directly viewed (i.e., at a 90-degree angle), and that only a single, uniform light source is cast upon the SOS. However, the present invention is not limited to this configuration, and other alternative viewing positions and lighting techniques may be considered.

Since several types of materials may be considered when generating a SOS that reproduces an image, a calibration of each of the one or more SOS materials may be first performed. This calibration is used to determine a reflectivity of a SOS relative to depths of pits established in the SOS.

Figure 2:
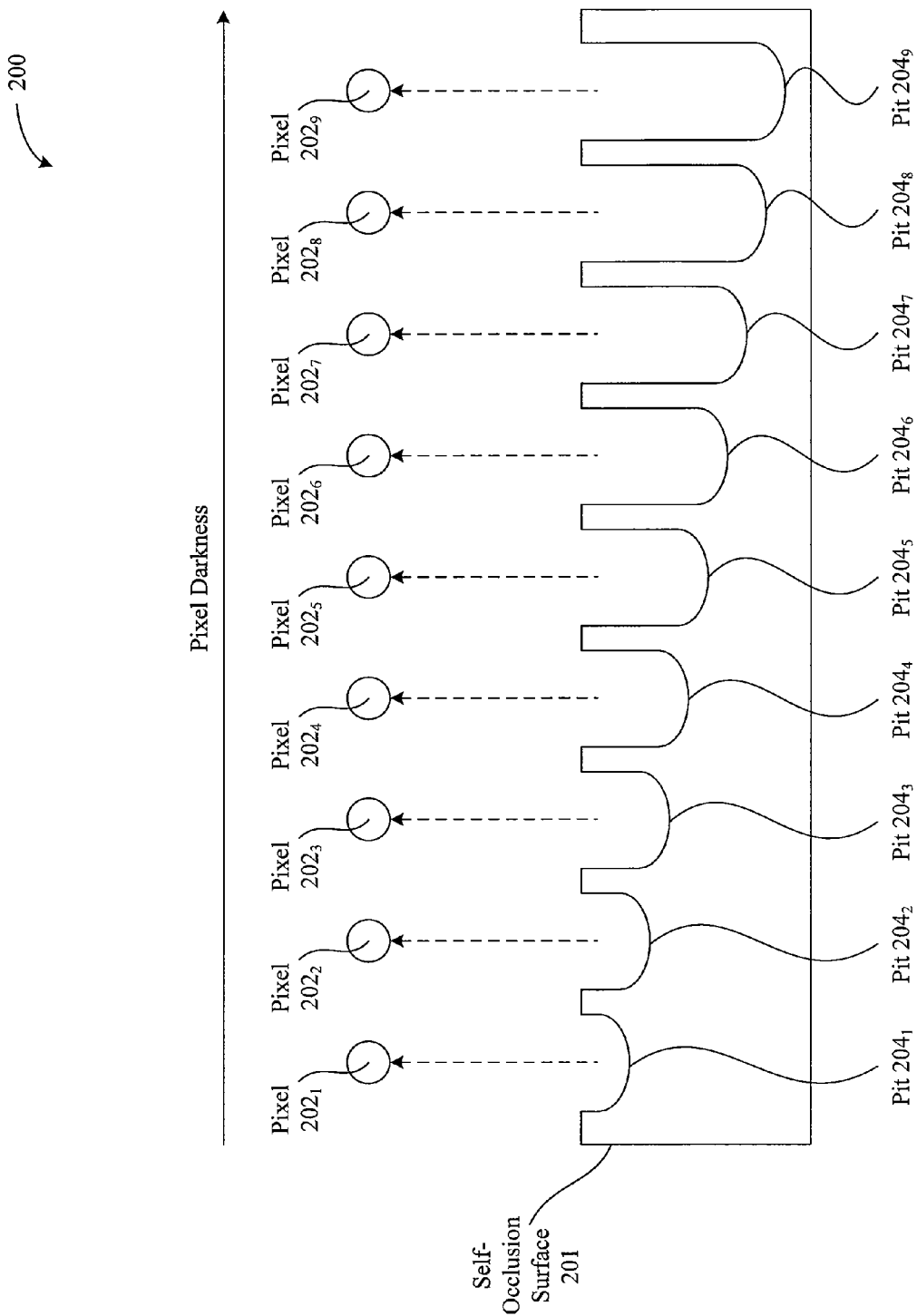
FIG. 2 is a conceptual diagram illustrating a calibration used to determine a reflectivity of a self-occlusion surface relative to pit depths in the self-occlusion surface, according to one embodiment of the invention.

FIG. 2 is a conceptual diagram illustrating a calibration 200 used to determine a reflectivity of a SOS relative to pit depths in the SOS. As shown, the calibration 200 is performed on a SOS 201 that may be composed of any conceivable material in which pits can be established, including wood, polymers, glass, stone, metal, or the like. To execute the calibration 200, a number of pits 204 are established in the SOS 201, with each pit 204 having a different depth. While FIG. 2 illustrates only pits $204_1$-$204_9$ in the SOS 201, it will be apparent to one having ordinary skill in the art that the accuracy of a calibration may be improved by establishing a larger number of pits 204 in the SOS 201.

Next, uniform lighting is provided to the SOS 201 in order to capture an image. Uniform lighting may be provided using, for example, a white diffuse light tent placed between a light source and the SOS 204. A camera is placed in direct view of the SOS 201 and captures an image of the SOS 201. Subsequently, the image is mapped to calibration data associated with the SOS 201 to compute a mapping between depths of pits $204_1$ and the reflectivities thereof. This mapping can be performed by, for example, using a hexagonal box filter that covers a Voronoi region of each pit. More specifically, integrating over a Voronoi region yields an effective reflectivity value of the corresponding pit. Then, an absolute reflectivity value is obtained by comparing the reflectivity value to a calibration white reflectivity target value extracted from the image (e.g., from an area of the SOS 201 that has no pits). In addition, reflectivities of intermediate pit depths (e.g., pit depths not established in SOS 201 during calibration 200) may be approximated using, for example, linear interpolation.

Figure 3:
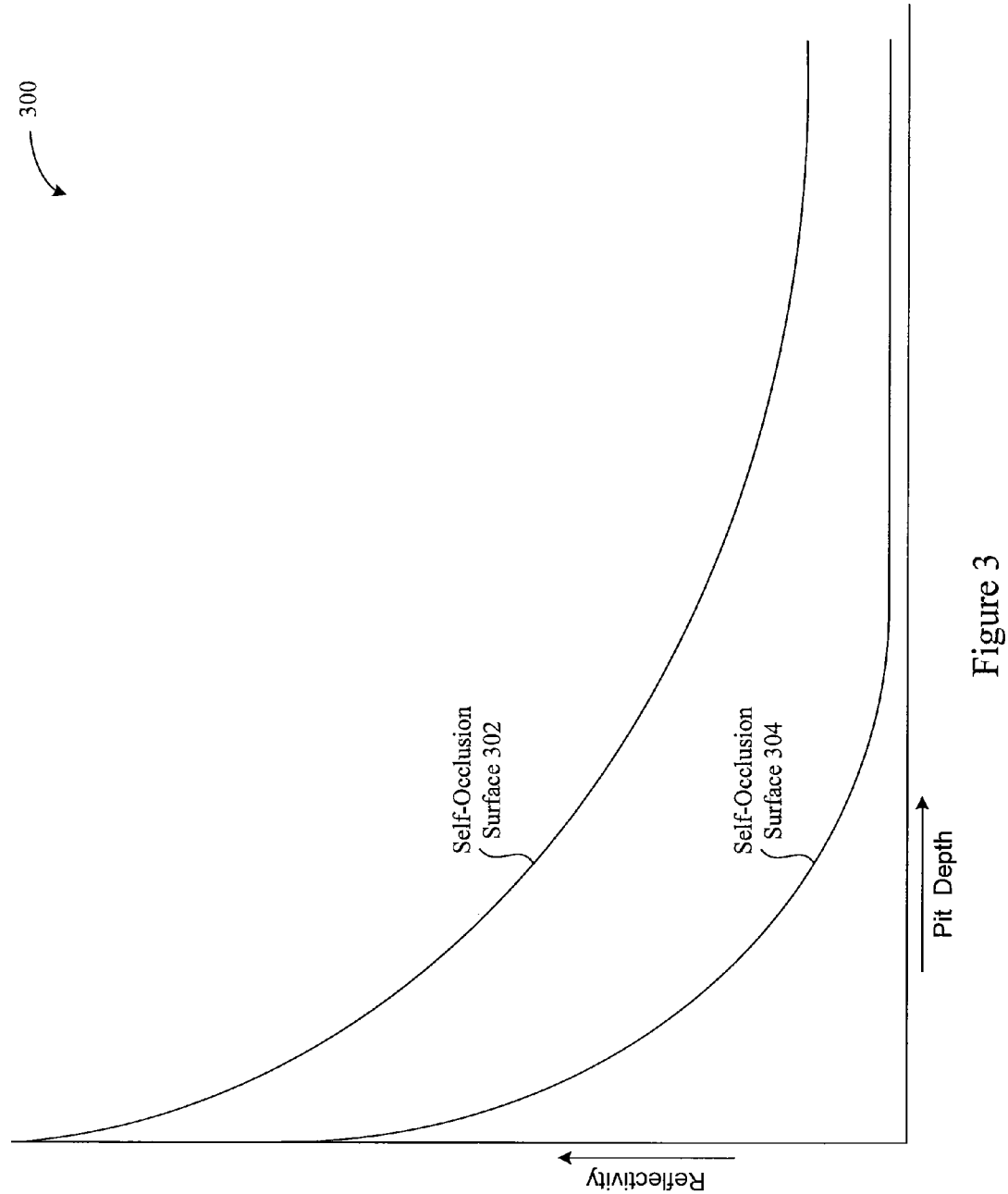
FIG. 3 is a conceptual diagram illustrating a graph that includes a function, for two different self-occlusion surfaces, that relates reflectivity value to pit depth in the self-occlusion surface, according to one embodiment of the invention.

FIG. 3 is a conceptual diagram illustrating a graph 300 that includes a function, for two different SOSs, that relates reflectivity value to pit depth in the SOS, according to one embodiment of the invention. As shown, the y-axis of the graph 200 is tied to a reflectivity that increases as y-values increase, while the x-axis of the graph 200 is tied to a pit depth that increases as x-values increase. As shown, the SOS 302 exhibits a broader range of reflectivity relative to pit depth. Accordingly, the SOS 302 is desirable over the SOS 304 when looking to reproduce images having a broad range of contrast.

Tone Mapping

In some embodiments, inverse mapping provides a technique to simulate how a SOS will reproduce an image. Such a simulation is useful in that it is not necessary to fabricate the SOS in order to determine how well the SOS reproduces the image, thereby saving time and costs. To simulate an appearance of a SOS, an input image is tone-mapped to an available reflectivity range exhibited by a material chosen for the SOS. For example, tests have shown that wood exhibits a reflectivity range from 0.25 to 0.50. Since the reflectivity range of wood is limited both in brightness and darkness, the brightness and darkness of the input image is remapped to the limited range of wood using techniques known to those having skill in the art.

The accuracy in which SOSs reproduce an image may be increased by using SOS materials that exhibit a wide range of reflectivity values. For example, the average reflectivity value of wood SOSs is around 50%, while the average reflectivity value of alumina oxide SOSs is around 90%. Also, contrast exhibited by pits is improvable by thinning the walls of the pits; therefore, fabricating the SOS with high-precision tools that allow the pits to be placed more closely together, which reduces the thickness of pit walls, enables the SOS to accurately reproduce images having a high range of contrast.

Other enhancements to the accuracy of image reproduction by a SOS may be realized by avoiding use of materials that have low subsurface light scattering properties that prevent light from bleeding through walls of the pits. However, SOS materials that exhibit high subsurface light scattering properties may be painted to establish an additional layer that prevents light from bleeding between the walls of the pits.

In addition, it is possible to produce a SOS that exhibits colors. This may be accomplished by, for example, fabricating a SOS that includes multilayer materials, where each layer is composed of differently-colored material. It is further possible to create animations within an SOS. More specifically, depths and/or placement of pits in an SOS may be continuously updated to reflect changes in features of an image. Such changes, when sequentially displayed, produce an animation within the SOS that is visible to the user.

Pit Placement

Given a surface area of the SOS, a desired pit radius, and a minimal distance between the pits, the largest number of pits can be placed in the SOS using a hexagonal grid. However, oftentimes, producing the largest number of pits does not yield an accurate reproduction of an image. For example, tests have shown that a uniform pit distribution, such as a hexagonal grid, may produce distracting visual artifacts along edge features included in the image. To determine an appropriate pit distribution technique, quantification is performed between an image reproduced by the SOS and the image. More specifically, the input image is represented as I(x,y) with a set of discretely-placed samples S. The set S contains elements s={$s_p$, $s_v$}, where $s_p$ is an image sample position and $s_v$ is a corresponding image value. Subsequently, each pit $p_i$ can be associated with a discrete representation of a Voronoi cell $S_i$, in the image, that is, $S_p$ includes the samples S that are closest to p. Based on this association, the average error is defined using the following equation:

$$E = \frac{1}{|S|} \sum_{p \in P} \sum_{s \in S_p} \|P_v - S_v\|$$

To maximize the accuracy with which the SOS reproduces an image, the pit centers are optimized using a grouping method such as Lloyd's method, as commonly known to those skilled in the art. Lloyd's method iterates between the definition of the Voronoi cell associated with each pit p and updates the position of the pit to be located at a centroid of the Voronoi cell. More specifically, each pit p is relocated into a position so that the value $p_v$ is in proximity to all associated values s, (i.e., each pit p represents a homogeneous area of the image). The foregoing technique is reflected in the definition of the two steps below, taking into consideration not only the positions but also the values of the pits p and the samples S. In the first step, the following cost function c(s, p) is used to associate each of the samples S to a pit position:

$$c(s,p) = \|s_p - p_p\| + \sigma_v \|s_v - p_v\|$$

Here, a weight $\sigma_v$ corresponds to the importance of image values compared to a Euclidean distance. Associating all samples S to all pits p may involve O-notation O(|S||P|) for a scan over all points. In addition, Dijkstra's algorithm, as known to those having skill in the art, may be used to enhance the speed of this process. In the second step of the algorithm, each pit center is moved towards a weighted centroid of sample points associated with the pit (computed in the first step). Assuming that a subset $S_p$ contains all image samples in S that are the closest to pit p (as determined in the above equation), a corresponding centroid $C_p$ is calculated as follows:

$$C_p = \frac{\sum_{s_i \in S_p} S_{i_p} \exp(-\|p_v - s_{i_v}\|^2 \sigma_w)}{\sum_{s_i \in S_p} \exp(-\|p_v - s_{i_v}\|^2 \sigma_w)}$$

Here, $\sigma_w$ is chosen so that it normalizes image values to a range [0,1]. Subsequently, given a centroid $C_p$ and the corresponding pit p, each pit position is updated to a value as follows: $p \leftarrow p + \delta(C_p - p)$, where parameter $\delta$ controls a step size towards the weighted centroid. In some embodiments, setting parameter $\delta$ to a value less than 0.1 improves convergence, which is desirable when the image sampling grid is low-resolution. Furthermore, the pit center update step can place the centers too close to each other for a given pit radius and minimal wall size. One solution involves disallowing such updates. Another solution involves selectively removing individual pits having a distance below a threshold. The following pseudo code in Table 1 is included to describe the algorithm for irregular pit distribution.

TABLE 1

Comparison of Pit Distributions

Figure 4:
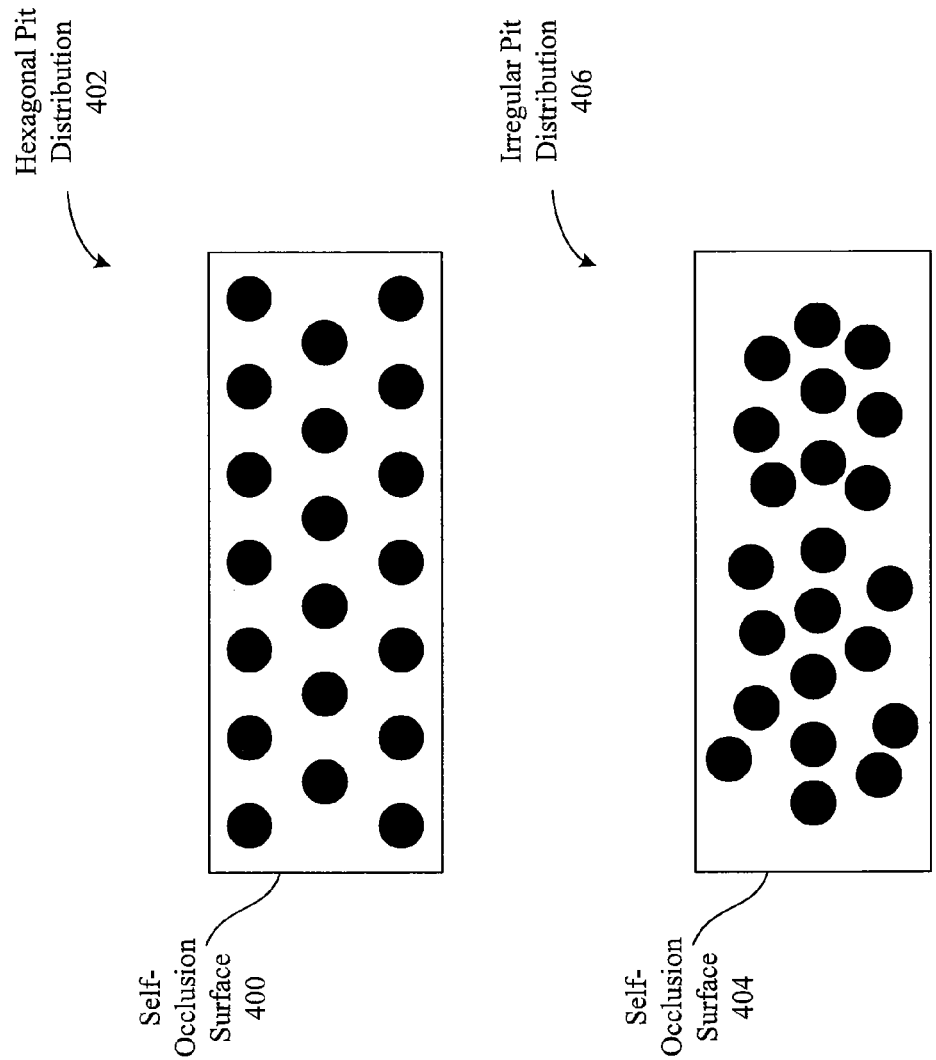
FIG. 4 is a conceptual diagram illustrating differences between a hexagonal pit distribution and an irregular pit distribution, according to one embodiment of the invention.

Algorithm: P ← IrregularDistribution(I, r)
BEGIN
    S ← ComputeISamples(I, r)
    P ← InitializePits(I, r)
    repeat
        $p_i \in P, S_i$ ← AssignISamples($S_i, p_i$)
        $p_i \in P, C_{i,p}$ ← ComputeCentroid($S_i, p_i$)
        $p_i \in P, p_i$ ← UpdatePit($C_{i,p}, p_i$)
    until P converges
END FIG. 4 is a conceptual diagram illustrating differences between a hexagonal pit distribution and an irregular pit distribution, according to one embodiment of the invention. As shown, SOS 400 includes a plurality of pits that are distributed using a hexagonal pit distribution 402. Also shown is a SOS 404 that that includes a plurality of pits that are distributed using an irregular pit distribution 406. As previously described, irregular pit distributions minimize artifacts that occur along edge features included in an image. In contrast, hexagonal pit distribution 402 causes positional misalignment between pits in the SOS 404 and the image features corresponding thereto. In some embodiments, a hexagonal distribution 402 of pits results in both a greater number of pits and a larger average error than a irregular distribution 406 of pits. Thus, in those embodiments, irregular pit distribution 406 both minimizes the number of pits and more accurately reproduces the image.

Figure 5:
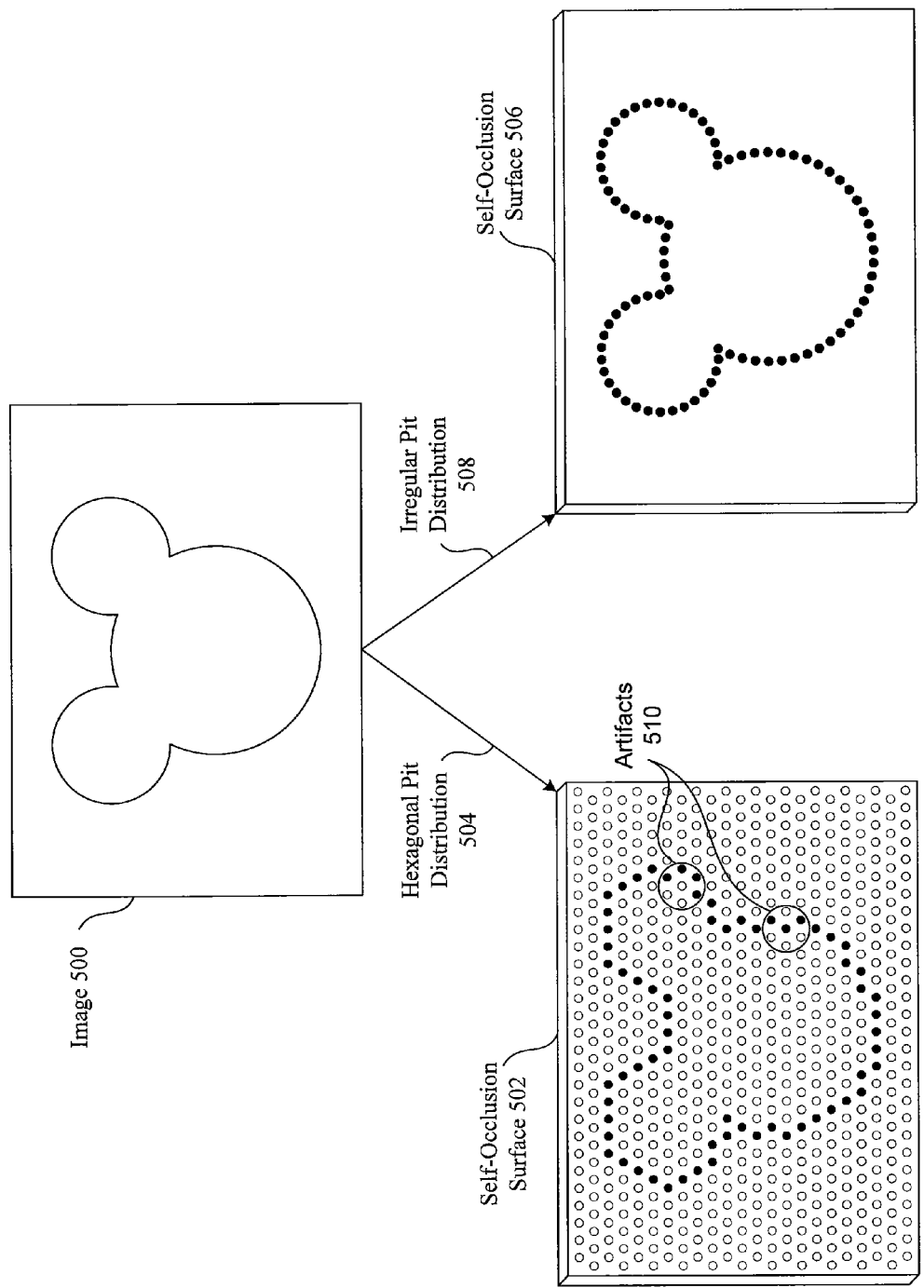
FIG. 5 is a conceptual diagram illustrating visual artifacts that occur through hexagonal pit distribution, according to one embodiment of the invention.

FIG. 5 is a conceptual diagram illustrating visual artifacts that occur through hexagonal pit distribution, according to one embodiment of the invention. As shown, SOS 502 is generated from an image 500 using the hexagonal pit distribution 504, while SOS 506 is generated from the image 500 using the irregular pit distribution 508. The image 500 includes three edge features that are not accurately reproduced by the SOS 502, which are highlighted by the artifacts 510. Such interruptions occur since the hexagonal pit distribution 504 requires pits to be placed in a predefined position mandated by the hexagonal grid associated therewith. In contrast, SOS 506—which is not bound to a particular pit distribution pattern—accurately reproduces the image 500 and is absent of the visual artifacts 510.

The advantages of irregular pit distribution 508 versus hexagonal pit distribution 504 are also apparent when reproducing highly geometric images including, for example, comic art and line art, abstract shapes, fonts and symbols, business logos, and the like.

Other embodiments of the invention may incorporate non-circular shaped pits, such as square, diamond, hexagonal, octagonal, and/or arbitrarily-shaped pits. The pits may also be tapered as they increase or decrease in depth, providing more advanced ways to control reflectivity thereof. Further, SOSs are not limited to planar SOSs and may be any three dimensional SOS in which pits may be established. For example, a three-dimensional plaster-based model of a human head could be pitted to establish advanced shadowing details through self-occlusion, thereby enhancing the overall aesthetic appeal thereof.

Fabrication of SOSs

Fabricating SOSs may be performed using various apparatuses including, but not limited to, a computer numerical controlled (CNC) milling machine or a three-dimensional (3D) printer. For example, pits may be established using a MicroMill 2000 by MicroProto Systems®, which is a desktop CNC milling machine having three axes of motion and an area of operation sufficient to fabricate a SOS that reproduces a detailed image. Moreover, the MicroMill 2000 is repeatable up to 0.01 millimeters (mm), thereby ensuring an acceptable level of precision. Various software systems may be used to control the MicroMill 2000, such as Mach3 control software by ArtSoft® to execute, for example, GCode—a standard command language for CNC machine tools.

As an alternative, 3D printers, such as an OBJET Connex 350 3D printer, may be used to fabricate self-occluding SOSs. 3D printers generally offer a level of precision that, also like CNC milling machines, ensures an acceptable level of precision when fabricating the SOS.

In another example, SOSs can be fabricated using molding methods, which could potentially deliver a higher resolution than CNC milling and 3D printing techniques. Further, pits may be added to a mold to establish grayscale images in any molded product. In prior art techniques, adding such graphics to SOSs requires an additional, expensive painting procedure that is often performed manually.

Figure 6:
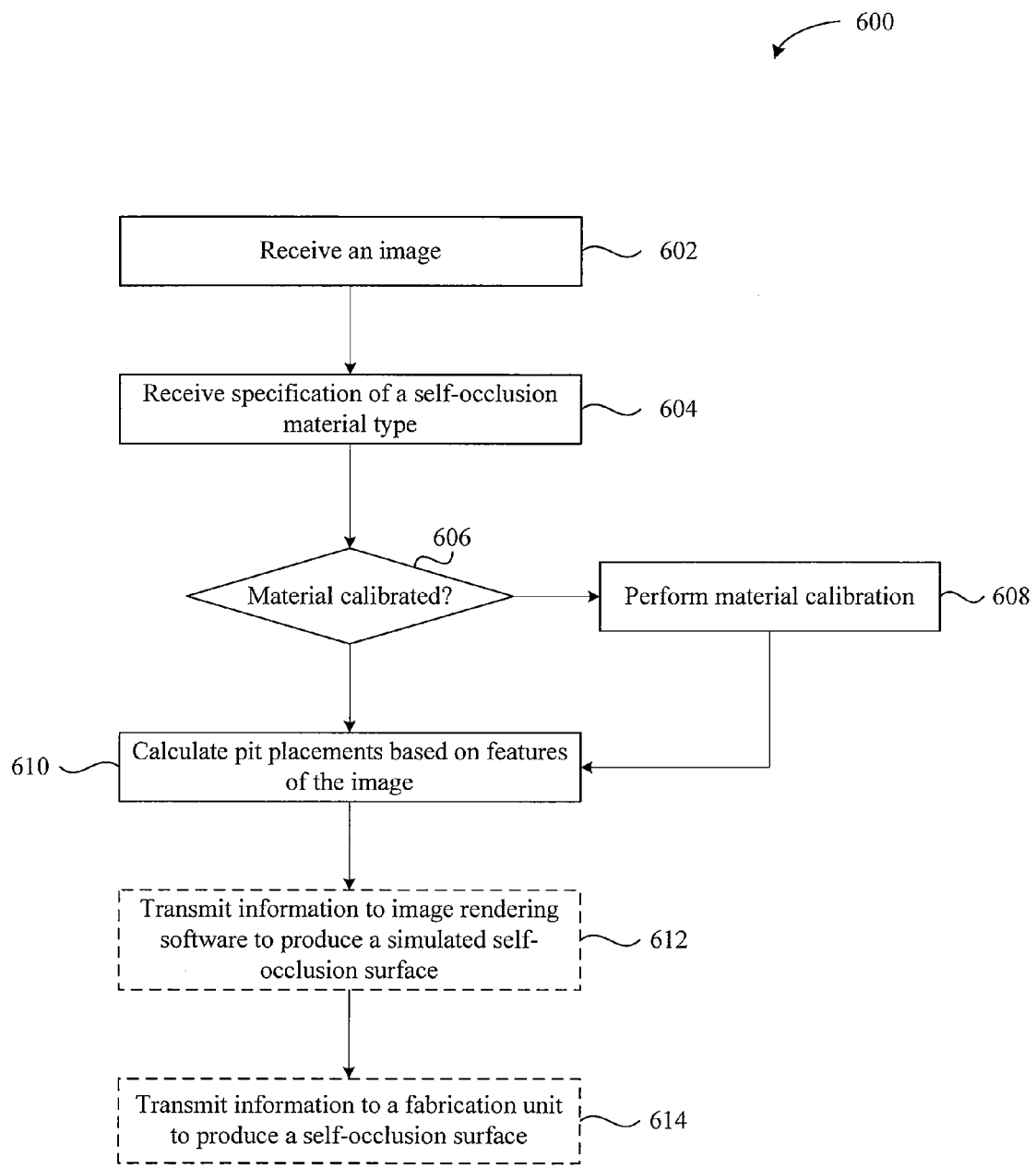
FIG. 6 is a flow diagram of method steps for simulating and/or fabricating a self-occlusion surface that reproduces an image, according to one embodiment of the invention.

FIG. 6 is a flow diagram of method steps for simulating and/or fabricating a SOS that reproduces an image, according to one embodiment of the invention. Persons skilled in the art will understand that, even though the method 600 is described in conjunction with the systems of FIGS. 1-5, any system configured to perform the method steps, in any order, is within the scope of embodiments of the invention.

As shown, the method 600 begins at step 602, where the computer system 100 receives an image. At step 604, the computer system 100 receives a specification of a SOS material. In one embodiment, the specification is made by a user of the computer system 100. In another embodiment, the computer system 100 may analyze the image and reference a list of SOS material to determine which SOS material best-reproduces the image.

At step 606, the computer system 100 determines whether the SOS material is calibrated. The computer system 100 is able to make this determination by, for example, referencing system memory 104 or system disk 108 for information associated with previously-calibrated SOS material. If, at step 606, the computer system 100 determines that the SOS is not calibrated, then the method 600 proceeds to step 608, where the SOS is calibrated according to the calibration techniques described above in conjunction with FIG. 2.

At step 610, the computer system 100 calculates pit placements based on features of the image. Such pit placements are calculated according to the techniques described above in conjunction with FIG. 4 and FIG. 5. For example, the pits may be organized in a hexagonal pit distribution, an irregular pit distribution, or any other pit distribution.

At step 612, the computer system 100 optionally transmits information gathered through steps 602-610 to the image rendering application 106. The image rendering application 106 produces a simulated SOS according to the simulation techniques described above. Subsequently, the user may choose to modify the simulated SOS by, for example, experimenting with different SOS materials, SOS thicknesses, pit radii, pit distribution techniques, pit shapes, among others, to establish a SOS that best-reproduces the image received in step 602.

At step 614, the computer system 100 optionally transmits information to a fabrication unit to produce a SOS. As described above, several techniques may be used to produce SOSs including 3D printing, CNC milling, molding methods, or the like.

In sum, embodiments of the invention provide techniques for simulating and/or fabricating a SOS that reproduces an image. In some embodiments, a SOS material is selected and calibrated. An image is received and analyzed to determine a mapping between features of the image and pits in the calibrated SOS. Although hexagonal pit distribution allows a maximum number of pits to be established in the SOS, irregular pit distribution, in most cases, generates a SOS that more accurately reproduces the image.

One advantage of embodiments of the invention is that simulating a SOS allows a user to determine the accuracy at which a SOS reproduces an image. This simulation eliminates the cost and time associated with fabricating the SOS and allows the user to dynamically modify properties of the SOS, thereby enabling the user to efficiently determine a SOS that best-reproduces the image. Another advantage associated with fabricated SOSs is that users can have an image printed onto a physical medium quickly and easily. For example, in the theme park setting, guests can have a photo taken while enjoying a theme park ride. Then, after the ride is over, the guest can have the option of purchasing a SOS that reproduces the image.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for generating a preview of a self-occlusion surface from an image, the method comprising:
   receiving the image;
   receiving a selection of a material with which to construct the self-occlusion surface;
   receiving calibration data associated with the material;
   determining, based on the image and the calibration data, a plurality of pits to define within the self-occlusion surface to visually represent the image, wherein each pit in the plurality of pits is associated with a placement and depth; and
   based on the determined plurality of pits, rendering the preview of the self-occlusion surface including the plurality of pits defined in the material.

2. The method of claim 1, further comprising fabricating the self-occlusion surface based on the preview which has been rendered and using a physical material corresponding to the selected material.

3. The method of claim 2, wherein the self-occlusion surface is fabricated via a three-dimensional (3D) printer.

4. The method of claim 2, wherein the self-occlusion surface is fabricated via a computer numerical controlled (CNC) milling machine.

5. The method of claim 2, wherein the self-occlusion surface is a non-planar surface.

6. The method of claim 2, wherein each pit in the plurality of pits does not extend through the physical material.

7. The method of claim 1, wherein the calibration data associated with the material is obtained by establishing, in a sample of the material, a plurality of calibration pits, each of which having a different depth, capturing an image of the material, and mapping the image to the calibration pits and an area of the self-occlusion surface that does not include a calibration pit.

8. The method of claim 7, wherein the calibration data is computationally expanded to include data associated with one or more pits that are not established in the sample of the material.

9. The method of claim 1, wherein each pit in the plurality of pits does not intersect any other pit in the plurality of pits.

10. The method of claim 1, wherein the plurality of pits is distributed across the self-occlusion surface in a non-uniform pattern.

11. The method of claim 1, wherein the self-occlusion surface is fabricated based on the rendered preview and using a physical material corresponding to the selected material, wherein each pit of the plurality of pits comprises an empty space disposed within the physical material and formed by an inner wall extending from an opening at an exterior surface of the physical material to a closed end opposite the opening.

12. The method of claim 1, wherein each pit of the plurality of pits is free from light being exchanged with other pits of the plurality of pits, wherein the image does not explicitly specify the placement of each individual pit of the plurality of pits, wherein the image does not explicitly specify the depth of each individual pit of the plurality of pits, wherein each pit in the plurality of pits in the preview has a depth that does not exceed the depth of the self-occlusion surface, wherein the placement and depth of each pit of the plurality of pits is fixed, wherein the placement and the depth of each pit is programmatically determined without requiring any user input explicitly specifying the placement and the depth of the respective pit.

13. The method of claim 1, wherein the self-occlusion surface is fabricated based on the rendered preview and using a physical material corresponding to the selected material, wherein the physical material comprises a plurality of layers, wherein each layer of the plurality of layer includes a differently-colored physical material.

14. A computer system, comprising:
a processor; and
a memory storing instructions that, when executed by the processor, cause the computer system to generate a preview of a self-occlusion surface from an image, by performing the steps of:
receiving the image;
receiving a selection of a material with which to construct the self-occlusion surface;
receiving calibration data associated with the material;
determining, based on the image and calibration data, a plurality of pits to define within the self-occlusion surface to visually represent the image, wherein each pit in the plurality of pits is associated with a placement and depth; and
based on the determined plurality of pits, rendering the preview of the self-occlusion surface including the plurality of pits defined in the material and using a physical material corresponding to the selected material.

15. The computer system of claim 14, wherein the steps further include fabricating the self-occlusion surface based on the preview which has been rendered and using the physical material.

16. The computer system of claim 15, wherein the self-occlusion surface is fabricated via a three-dimensional (3D) printer.

17. The computer system of claim 15, wherein the self-occlusion surface is fabricated via a computer numerical controlled (CNC) milling machine.

18. The method of claim 15, wherein the self-occlusion surface is a non-planar surface.

19. The computer system of claim 15, wherein each pit in the plurality of pits does not extend through the physical material.

20. The computer system of claim 14, wherein the calibration data associated with the material is obtained by establishing, in a sample of the material, a plurality of calibration pits, each of which having a different depth, capturing an image of the material, and mapping the image to the calibration pits and an area of the self-occlusion surface that does not include a calibration pit.

21. The computer system of claim 20, wherein the calibration data is computationally expanded to include data associated with one or more pits that are not established in the sample of the material.

22. The computer system of claim 14, wherein each pit in the plurality of pits does not intersect any other pit in the plurality of pits.

23. The computer system of claim 14, wherein the plurality of pits is distributed across the self-occlusion surface in a non-uniform pattern.

24. A non-transitory computer-readable storage medium storing instructions that, when executed by a processor, cause a computer system to generate a preview of a self-occlusion surface from an image, by performing the steps of:
receiving the image;
receiving a selection of a material with which to construct the self-occlusion surface;
receiving calibration data associated with the material;
determining, based on the image and calibration data, a plurality of pits to define within the self-occlusion surface to visually represent the image, wherein each pit in the plurality of pits is associated with a placement and depth; and
based on the determined plurality of pits, rendering the preview of the self-occlusion surface including the plurality of pits defined in the material.

25. The non-transitory computer-readable medium of claim 24, wherein the steps further include fabricating the self-occlusion surface based on the preview which is rendered and using a physical material corresponding to the selected material.

26. An apparatus configured to manufacture a self-occlusion surface, comprising:
a processor configured to:
receive input data that is generated by performing the steps of:
receiving a selection of a material with which to construct the self-occlusion surface;
receiving calibration data associated with the material;
determining, based on an image and calibration data, a plurality of pits to define within the self-occlusion surface to visually represent the image, wherein each pit in the plurality of pits is associated with a placement and depth; and
based on the determined plurality of pits, rendering a preview of the self-occlusion surface including the plurality of pits defined in the material; and
cause the self-occlusion surface to be manufactured based on the set of input data.

* * * * *